Figure 2:
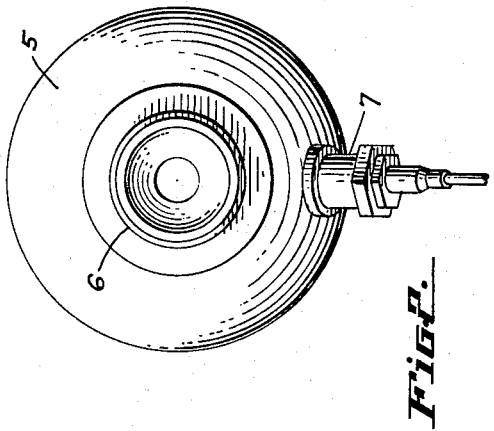

Feb. 26, 1957     J. W. PARSONS     2,783,138
PROPELLANT COMPOSITIONS
Filed April 11, 1944

INVENTOR.
JOHN W. PARSONS
BY
Christie & Angus
ATTORNEYS.

United States Patent Office 2,783,138
Patented Feb. 26, 1957

2,783,138

PROPELLANT COMPOSITIONS

John W. Parsons, Pasadena, Calif., assignor, by mesne assignments, to Aerojet-General Corporation, Cincinnati, Ohio, a corporation of Ohio Application April 11, 1944, Serial No. 530,527

2 Claims. (Cl. 52—.5)

My invention relates to jet propulsion and more particularly to methods and means for increasing the usefulness of rocket motors utilizing solid propellants.

In general a rocket motor comprises a combustion chamber having a nozzle in the wall thereof, a combustible charge within the chamber, and means for igniting the charge. My copending application, Serial No. 503,254, filed September 21, 1943, now Patent No. 2,563,265, discloses a solid propellant comprising an inflammable thermoplastic propellant bonded to the wall of the combustion chamber by a plastic liner. As a result burning is restricted to one surface of the propellant charge, giving a steady thrust for a comparatively long duration. This phenomenon of combustion in parallel layers I call "restricted burning."

The propellant disclosed in my said copending application comprises fine particles of a solid oxidizer uniformly dispersed in a plastic fuel which fills the interstices between the particles of the oxidizer. The said copending application discloses the use of KClO$_4$ as the oxidizer. One of the products of combustion of KClO$_4$ is a solid salt, KCl, resulting in large dense clouds of white smoke during operation. Such clouds of smoke are particularly detrimental when such motors are used to assist the take-off of aircraft from an aircraft carrier, since they obscure the flight deck and may betray the location of the aircraft carrier.

By using my present invention, little or no smoke is produced during operation and high specific impulse is obtained. At the same time my invention has the advantages of the restricted burning disclosed in my above-mentioned copending application.

In carrying out one form of my invention I use an oxidizing agent containing no metal ion, for example, ammonium perchlorate, ammonium nitrate, guanidine perchlorate, guanidine nitrate, nitro guanidine, hexanitroethane, or other similar nitroamines or nitroaliphatics comprising a large percentage of oxygen as the solid oxidizer; distributed through a thermoplastic fuel such as an asphalt, an asphaltic mixture, or a wax.

As a specific example, 75% of finely divided ammonium perchlorate is added to 25% of a molten fuel mixture consisting of 30% S. A. E. No. 10 Pennsylvania oil and 70% of a Texas asphalt, for example, of the composition disclosed in my application, Serial No. 503,254, filed September 21, 1943 now Patent No. 2,563,265. The resulting mixture may be loaded into a rocket motor in the manner described in my above-mentioned copending application.

When the use of these materials produces a propellant having a comparatively low burning rate, which would require the motor to have an undesirably large ratio of cross section to length, I increase the rate by adding to the fuel and the oxidizer additives which will increase the burning rate of the propellant and at the same time increase the specific impulse.

These additives comprise, for example, nitroaromatic or nitroaliphatic compounds which are compatible with the fuel used in the propellant, and partially replace the usual oxidizer, also increasing the burning rate.

Some examples are the mono, di, tri, or poly nitrocompounds of aromatic compounds such as benzene, toluene, phenol, xylene xylidine or coal tar, and nitrated aliphatic compounds such as nitrocellulose or smokeless powder, or nitrated plastic substances such as nitrated resin, nitrated wax, nitrated oil, or nitrated asphalt.

As a specific example, 50% of ammonium perchlorate in a finely divided state is added to a molten fuel mixture consisting of 50% trinitrotoluene, 25% S. A. E. No. 10 Pennsylvania oil and 25% of a Texas asphalt, for example, of the composition disclosed in my said application, Serial No. 503,254 now Patent No. 2,563,265. The resulting mixture may be loaded into a rocket motor in the manner described in my copending application, Serial No. 503,254, filed September 21, 1943 now Patent No. 2,563,265. Some further increase in burning rate may also be accomplished by providing the oxidizer in a more finely divided form.

According to another form of my invention I provide a propellant in which no solid oxidizing salt is required to be dispersed throughout the fuel. I accomplish this by adding to the fuel a sufficient amount of nitrocompound so that no other source of oxygen is required. The compound so used should have at least enough oxygen to burn all the carbon in the mixture to CO, since some fuel in addition to the nitrocompound is required as a plasticizing or colloidalizing and desensitizing agent for the nitrocompound.

For example, an oxygen-containing compound such as pentaerythritol tetranitrate, trinitrocyclohexylamine, or nitropentane is plasticized with a plasticizing agent such as wax, resin, pitch, asphalt, polybutene, ethylcellulose, dibutyl phthalate or dibutyl sebacate.

As a specific example, 85% trinitrocyclohexylamine is plasticized with 15% beeswax. The resulting mixture being cast into a rocket motor in the manner described in my copending application, Serial No. 503,254 now Patent No. 2,563,265.

If I use an oxidizing agent containing a metal ion, such as potassium perchlorate, in combination with one of the above described oxygen containing fuels, I can reduce the amount of oxidizing agent and consequently materially reduce the smoke produced, obtaining as a result a semi-smokeless propellant having a high specific impulse. Further, by selecting an oxidizing agent having a higher ratio of oxygen to metal ion, such as aluminum perchlorate, lithium perchlorate, magnesium perchlorate, sodium perchlorate, aluminum nitrate, or lithium nitrate, I can obtain a further reduction of smoke and an increase in specific impulse.

As a specific example, 30% of sodium perchlorate is added to a mixture of 30% trinitrotoluene, 30% trinitrocyclohexylamine, 8% dibutyl phthalate, and 2% of ethylcellulose, rubber latex, or polybutene, the resulting mixture being cast into a rocket motor in the manner described in my said copending application, Ser. No. 503,254 now Patent No. 2,563,265.

Figure 1:
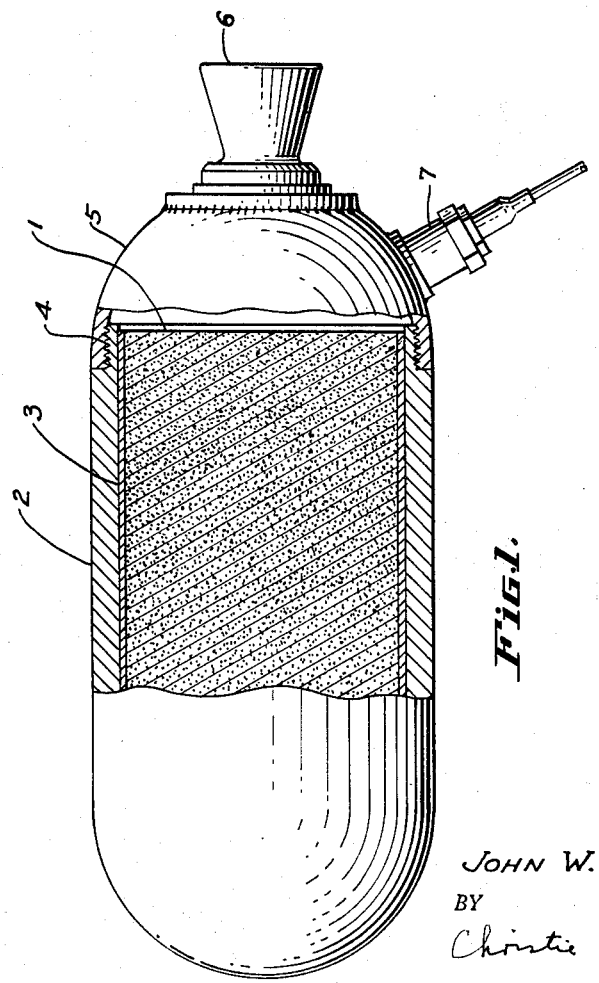

The invention will be better understood from the following detailed description and the accompanying drawing in which:

Fig. 1 shows a cutaway view of a jet motor, partly in cross section, showing the relation of the propellant charge, liner and motor to each other; and Fig. 2 shows an end view of the motor taken at the nozzle end.

The assembled motor and charge employed in carrying out my invention comprises a propellant charge 1 such as hereinbefore suggested, is contained in a combustion chamber 2 and is bonded to the walls of the combustion chamber 2 by a thermoplastic liner 3, composed, for example, of a mixture of rubbery pitch and oil. The combustion chamber 2 is suitably threaded at its open end 4 onto which is screwed a chamber cap 5 provided with an exhaust nozzle 6 and a squib ignitor 7.

Such a motor will give a constant reliable thrust for a comparatively long duration on firing, yielding a high specific impulse and producing substantially no smoke.

I claim:

1. A propellant composition comprising about 50% ammonium perchlorate, incorporated with a thermoplastic mixture comprising about 50% trinitrotoluene, 25% S. A. E. No. 10 oil and 25% asphalt.

2. A propellant composition comprising about 50% ammonium perchlorate, about 25% trinitrotoluene, about 12½% asphalt and about 12½% of a stable liquid paraffin hydrocarbon.

References Cited in the file of this patent

UNITED STATES PATENTS

| | | |
|---|---|---|
| 826,293 | Unge | July 17, 1906 |
| 933,060 | Clement | Sept. 7, 1909 |
| 1,041,745 | Corbin | Oct. 22, 1912 |
| 1,102,653 | Goddard | July 7, 1914 |
| 1,276,537 | Johnson | Aug. 20, 1918 |
| 1,309,014 | Brown | July 8, 1919 |
| 1,376,029 | Olsen | Apr. 26, 1921 |
| 1,393,463 | Sturgis | Oct. 11, 1921 |
| 1,808,613 | Snelling | June 2, 1931 |
| 1,867,287 | Stettbacher | July 12, 1932 |
| 2,069,612 | Kirst | Feb. 2, 1937 |
| 2,090,608 | Holm | Aug. 17, 1937 |
| 2,159,234 | Taylor | May 23, 1939 |
| 2,165,263 | Holm | July 11, 1939 |
| 2,185,248 | Davis | Jan. 2, 1940 |
| 2,479,470 | Carr | Aug. 16, 1949 |

FOREIGN PATENTS

| | | |
|---|---|---|
| 1,969 | Great Britain | of 1882 |
| 19,267 | Great Britain | of 1891 |
| 10,362 | Great Britain | of 1897 |
| 1,573 | Great Britain | of 1906 |
| 15,916 | Great Britain | of 1908 |
| 20,214 | Great Britain | of 1908 |
| 51,814 | Switzerland | Apr. 7, 1910 |
| 427,951 | France | June 10, 1911 |
| 14,932 | Great Britain | 1915 |
| 477,678 | France | Aug. 3, 1915 |
| 125,128 | Great Britain | Apr. 17, 1919 |

OTHER REFERENCES

American Bulletin of Interplanetary Society, No. 16, February 1932, pp. 8–10, article by Lemkin. (Copy in Scientific Library.)